(12) United States Patent
Bacquey et al.

(10) Patent No.: US 9,169,022 B2
(45) Date of Patent: Oct. 27, 2015

(54) MONOBEAM SEAT WITH HOUSING RECEPTACLE

(71) Applicant: EADS SOGERMA, Rochefort Cedex (FR)

(72) Inventors: Lionel Bacquey, Merignac (FR); Remy Barre, Echillais (FR); Laurent Cecinas, Breuil Magne (FR); Julien Normandin, Marennes (FR)

(73) Assignee: STELIA AEROSPACE, Rochefort (FR)

( * ) Notice: Subject to any disclaimer, the term of this patent is extended or adjusted under 35 U.S.C. 154(b) by 0 days.

(21) Appl. No.: 14/331,152

(22) Filed: Jul. 14, 2014

(65) Prior Publication Data

US 2015/0021437 A1  Jan. 22, 2015

(30) Foreign Application Priority Data

Jul. 17, 2013 (FR) ...................... 13 57008

(51) Int. Cl.
*B60R 21/00* (2006.01)
*B64D 11/06* (2006.01)
*B64C 1/18* (2006.01)
*B60N 2/50* (2006.01)

(52) U.S. Cl.
CPC .............. *B64D 11/0696* (2013.01); *B64C 1/18* (2013.01); *B64D 11/0619* (2014.12); *B60N 2/502* (2013.01); *B60N 2/509* (2013.01); *B64D 11/06* (2013.01); *B64D 11/0689* (2013.01); *B64D 2011/0644* (2013.01)

(58) Field of Classification Search
CPC ........... B64D 11/06; B64D 2011/0603; B64D 2011/0627; B64D 2011/0631; B64D 2011/0689; B64D 11/0689; B60N 2/502; B60N 2/509

USPC .......... 297/216.1, 354.1, 452.19, 357, 452.2, 297/216.2, 216.17, 216.13, 340, 452.18, 297/411.36, 344.12, 344.18, 354.13
See application file for complete search history.

(56) References Cited

U.S. PATENT DOCUMENTS

| | | | | |
|---|---|---|---|---|
| 3,532,379 A | * | 10/1970 | Gonsalves, Jr. et al. | 297/216.17 |
| 3,625,563 A | * | 12/1971 | Dickinson et al. | 297/333 |
| 4,204,659 A | * | 5/1980 | Phillips et al. | 248/562 |
| 4,254,991 A | * | 3/1981 | Venieris | 297/344.18 |
| 4,523,730 A | * | 6/1985 | Martin | 244/122 R |
| 4,525,010 A | * | 6/1985 | Trickey et al. | 297/216.17 |
| 4,889,389 A | * | 12/1989 | White et al. | 297/468 |
| 5,758,859 A | * | 6/1998 | Gonzalez | 248/619 |

(Continued)

FOREIGN PATENT DOCUMENTS

| | | |
|---|---|---|
| DE | 10108741 A1 | 9/2002 |
| EP | 1564140 A1 | 8/2005 |
| FR | 1150849 A | 1/1958 |

*Primary Examiner* — Chi Q Nguyen
(74) *Attorney, Agent, or Firm* — Im IP Law PLLC; C. Andrew Im

(57) ABSTRACT

A seat-floor assembly for a vehicle comprises a floor element and at least one monobeam seat fixed to the floor element by a beam. A seat cushion and a seat backrest fixed to the beam. The floor element comprises a stiffened panel structure, one face of which forms a top sole of at least one floor crossmember. The floor element further comprises a housing receptacle open on the top sole and fixed to the top sole and/or to the at least one floor crossmember. At least one monobeam seat is fixed to the beam. An aircraft fuselage comprises a floor with such seat-floor assemblies and reinforced by the structure of the floor elements.

16 Claims, 3 Drawing Sheets

(56) References Cited

U.S. PATENT DOCUMENTS

| | | | |
|---|---|---|---|
| 6,179,380 B1 * | 1/2001 | Hoffman | 297/216.17 |
| 6,224,154 B1 * | 5/2001 | Stoki | 297/339 |
| 6,267,440 B1 * | 7/2001 | Hoffman | 297/216.1 |
| 7,413,247 B2 * | 8/2008 | Van Druff et al. | 297/216.17 |
| 7,744,155 B2 * | 6/2010 | List et al. | 297/216.17 |

* cited by examiner

MONOBEAM SEAT WITH HOUSING RECEPTACLE

RELATED APPLICATIONS

This application claims priority from French Patent Application No. 13 57008 filed Jul. 17, 2013, which is herein incorporated by reference in its entirety.

TECHNICAL FIELD OF THE INVENTION

The present invention falls within the field of seats for means of transport, for example for aircraft.

More specifically, the invention relates to a seat with a monobeam structure, which seat is provided with an interface for fixing to a vehicle structure such as a vehicle floor.

The invention also relates to a vehicle floor incorporating such a fixing interface and to a seat-floor assembly incorporating such a fixing interface.

BACKGROUND OF THE INVENTION

In the field of transport vehicles it is known practice to fix seats intended for the passengers or for crew members to the structure of the vehicle.

In the known way, the seats are often fixed to the floor of the vehicle either at fixed predetermined locations or on rails secured to the floor that allow each seat to be positioned at various locations without having to rework the floor structure and the fixing points.

The latter solution is widely used in the case of aircraft where it allows very different configurations to be set out according to the type of comfort desired by the aircraft operator.

The latter solution can also, as illustrated in FIG. 1, be used in the case of a seat 10 with what is referred to as a monobeam structure, in which a seat cushion and backrest assembly 11 is secured to a substantially vertical beam 12, inclined to a greater or lesser extent, generally towards the rear of the seat, with respect to the vertical.

The beam 12 is then secured to a support structure 13 comprising fixing points which are set out for being fixed to the rails 14 of the floor 15.

In these solutions it is necessary to have mechanical clearances which are needed for absorbing defective positioning of the fixing points caused by manufacturing tolerances or caused by deformations in the structures, whether these fixing points are directly on the structure or whether they are on rails. These required clearances therefore lead to feelings of instability for the occupants of the seats and to noises when the seat is in a vibrational environment, as, in vehicles, it often is.

Furthermore, the seat is generally required to have comfort settings which, when the seat is fixed to the floor, allow the seat cushion and the backrest to be moved, usually longitudinally, vertically and in terms of inclination. These adjustments when desired on the seat entail additional mechanisms independent of the means of fixing to the floor and which, leaving aside their complexities and cost, increase the mass of the seat, notably in the upper parts of the seat, the consequences of this being that the structure has to be reinforced in order to meet crash testing requirements, something which particularly in aeronautical applications proves to be penalizing. The clearances necessary for fixing the seat are also a source of defective operation in the sliding parts of the seats.

OBJECT AND SUMMARY OF THE INVENTION

The present invention proposes an arrangement in which the seat is fixed to the structure of a vehicle by a housing receptacle, which housing receptacle can be associated with a floor element.

An assembly according to the invention comprises a monobeam seat and means for fixing the beam of the seat to a structure of a vehicle, beam to which the seat cushion and the seat backrest are fixed. The cushion and the backrest may constitute a rigid shell or be articulated relative to one another.

The fixing means comprise a housing receptacle that is open on a top face of the housing receptacle and the seat is fixed by the beam that enters the housing receptacle via the top face thereof so that a substantial proportion of the load generated by the monobeam seat in use is transmitted to the housing receptacle.

This then yields a means that both is simple to implement and performs well for fixing a seat to a structure of the vehicle, it being possible for the seat to be fitted and removed by housing the single beam of the seat in the housing receptacle fixed to the structure of the vehicle, which structure may be a floor structure or some other suitable structure suited to reacting the load generated by the seat. The use of one concentrated seat fixing avoids the clearances needed for fitting in the known solutions and the problems originating from these clearances.

In a preferred embodiment, the monobeam seat is fixed only by the beam entering the housing receptacle, the result of which arrangement being that all of the load generated on the monobeam seat is transmitted to the structure of the vehicle via the housing receptacle and that the structure of the seat is unaffected by deformations of the structure of the vehicle, particularly in the event of a crash, making it possible to maintain the structural integrity of the seat when such deformations are present.

This then avoids the use of complex load paths and multiple fixing points which have the effect of making the seat more complicated and less rapid to fit and to remove.

In one embodiment, the housing receptacle comprises fixing points which are intended to fix it directly or indirectly to the structure of the vehicle, which are arranged so that the fitting of the housing receptacle is reversible in a longitudinal orientation so that the monobeam seat, the beam of which is held in the housing receptacle, can be fixed in the vehicle with the front facing in one direction or in the opposite direction without the need to rework the fixing means.

It is thus possible, with standard elements, to fit a seat either facing towards the front of the vehicle or facing towards the rear of the vehicle, whether this option is taken up when fitting out a cabin or when reconfiguring the cabin of the vehicle when the means of fixing the housing receptacle to the structure of the vehicle allow it to be removed.

In one embodiment, the housing receptacle comprises an immobilizing device for fixing the beam in at least two different positions.

It is thus possible to adjust the position of the seat without a need to modify the housing receptacle.

In one embodiment, in order to allow adjustment of the longitudinal position of a seat, the housing receptacle is elongate in the longitudinal direction and the immobilizing device is arranged to be able to fix the beam in the housing receptacle in at least two different positions in the longitudinal direction.

In one embodiment, in order to allow adjustment of the lateral position of a seat, the housing receptacle is elongate in the transverse direction and the immobilizing device is arranged to be able to fix the beam in the housing receptacle in at least two different positions in the transverse direction.

In one embodiment, in order to allow adjustment of the inclination of the beam with respect to the vertical and therefore the overall inclination of the seat more or less in a longitudinal direction, the immobilizing device of the housing receptacle is arranged in such a way that the beam can be fixed in the housing receptacle in at least two different angular positions in terms of an inclination in a longitudinal vertical plane.

In one embodiment, in order to allow the direction of a seat to be adjusted, the immobilizing device is arranged in such a way that the beam can be fixed in the said housing receptacle with a vertical plane of symmetry of the seat in at least two different positions in terms of direction with respect to the longitudinal direction.

The various adjustment options above can be combined as needed.

In one embodiment, the housing receptacle comprises a sliding and/or pivoting sleeve as appropriate, and the sleeve comprises means of locking its position in the housing receptacle, the beam in this case preferably being held fixed in the sleeve.

All of the functions for modifying or adjusting the position of the seat with respect to the floor element are thus transferred to the housing receptacle without this adversely affecting the complexity of the seat.

In one embodiment, the beam or the sleeve in which the beam is fixed are immobilized in the housing receptacle by locking means at the time of installation of the seat.

In other embodiments, controls are arranged so that they are accessible to a user of the seat for unlocking and locking the immobilizing device or for actuating the locking means in different positions.

Thus there is obtained a seat, at least some of the positions of which can be adjusted by the occupant of the seat.

Advantageously, a space between the beam and a top opening of the housing receptacle is closed off by one or more flaps and/or by a gaiter so as to prevent objects from falling into the housing receptacle.

In one embodiment, the invention relates to a seat-floor assembly for a vehicle which comprises at least one monobeam seat and at least one housing receptacle corresponding to the configurations described hereinabove for this assembly and which comprises a floor element, which floor element comprises a stiffened panel structure, one face of which forms a top sole of at least one floor crossmember, the housing receptacle being open on the top sole and fixed to the top sole and/or to the at least one floor crossmember.

There is thus obtained an assembly incorporating a floor structure that is pre-equipped and optimized to react the fixing of the seats and ready to be fixed to the structure of the vehicle of which it forms a part.

In one embodiment, the structural connection between the housing receptacle and the top sole and/or the floor crossmember or crossmembers is reinforced by gusset plates and/or by structural connecting rods.

The invention also relates to a vehicle comprising a seat-floor assembly according to the invention and in particular to an aircraft in which the structure of the floor element is taken into consideration in the structural engineering of the aircraft fuselage structure.

BRIEF DESCRIPTION OF THE DRAWINGS

Nonlimiting embodiments of the invention are described with reference to the figures which schematically depict.

DETAILED DESCRIPTION OF THE EMBODIMENTS

In the various figures that depict various embodiments of the invention, elements that are equivalent even though of different structure bear the same reference.

Figure 2:
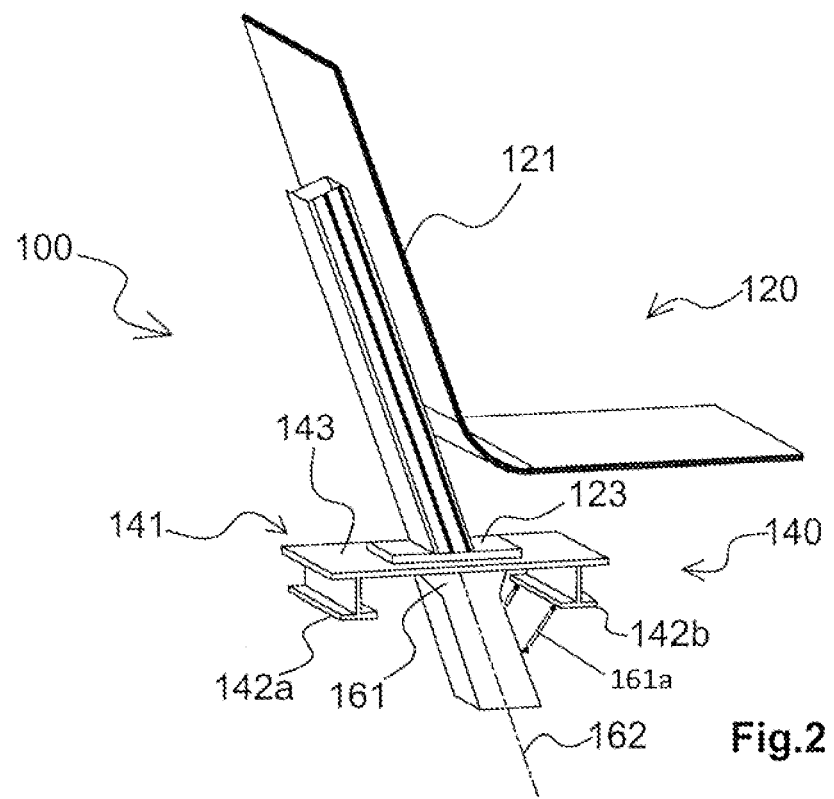
FIG. 2: a first embodiment according to the invention, in which the beam of the seat is fixed in the housing receptacle which is itself fixed to a floor structure to constitute a seat-floor assembly in which the beam adopts just one position in the housing receptacle.

FIG. 2 schematically illustrates a first embodiment of the invention applied to the case of a seat-floor assembly 100 of a vehicle according to the invention.

Although it is described in detail in conjunction with an embodiment incorporating a structural element corresponding to a floor element to which a housing receptacle is fixed, it must be understood that the housing receptacle can be fixed more or less directly to other structural elements of the vehicle which cannot necessarily be likened to a floor.

The seat-floor assembly 100 comprises a monobeam seat 120 and a floor element 140 of a floor of a cabin, not depicted.

The monobeam seat 120 is depicted here in simplified form as a seat shell 121, which seat shell is attached to a beam 122 that is substantially vertical, in practice inclined towards the rear of the seat.

The structure of the seat shell 121, of the beam 122 and of the elements, not depicted, via which the said seat shell is secured to the said beam in a fixed or adjustable manner are not described here, examples being known from the prior art.

The floor element 140, just part of which has been illustrated in the seat fixing region, comprises a first structure taking the form of a stiffened panel 141.

Although the illustration of this first embodiment, and the illustrations of the embodiments described later on, depicts just one seat, a floor element may, and in theory does, comprise several seats, the floor element being intended to correspond to a width of a cabin floor in which cabin the seats are generally arranged in rows.

The stiffened panel 141 itself comprises at least one floor crossmember 142a, 142b with a high amount of inertia, an I-section crossmember in the example illustrated, a top sole 143 of which extends in a horizontal plane, here considered to be a reference plane of the floor.

For preference, the top sole 143 extends between at least two floor crossmembers 142a, 142b for which floor crossmembers it forms a top sole 143 common to the said at least two floor crossmembers.

It should be considered here that the way in which the stiffened panel structure 141 is created may employ any technique known for such an example of a structure, particularly the assembly of elementary or complex components made of metal or non-metallic composite materials or the creation of integral structures, for example by machining, forming or moulding metallic materials or fibre-reinforced polymers.

The floor crossmembers may also have other open-section shapes, for example C-shapes or Z-shapes or closed section shapes forming box sections.

The floor element 140 also comprises a housing receptacle 160.

The housing receptacle 160 is a structural box section in so far as the structure of the receptacle is produced so that it can transmit load from the seat to the floor.

The housing receptacle 160 is fixed to the top sole 143 and, in a preferred embodiment as illustrated, lies mainly underneath the said top sole, i.e. under the floor, on the same side as the floor crossmembers 142a, 142b.

The housing receptacle 160 may also be fixed to one or more floor crossmembers, or even to other structural elements of the vehicle.

The housing receptacle 160 is open at least on a top face so that the inside of the said receptacle is accessible from the top of the floor.

Furthermore, a cross section through the housing receptacle 160 on a plane parallel to the floor is large enough that a base 123 of the beam 122 entering the said housing receptacle via the top face can be housed therein.

The monobeam seat 120 is connected to the structure of the vehicle, directly or via a floor element, by the housing receptacle 160 which immobilizes the beam 122 and transmits a substantial proportion of the load generated at the seat.

In one embodiment, the monobeam seat 120 is connected to the structure of the vehicle, directly or via a floor element, only by the housing receptacle 160 which immobilizes the beam 122 and reacts all of the load generated at the seat.

A person skilled in the art will appreciate here that the housing is determined from the structural strength standpoint in terms of the various seat loading scenarios and needs to be calculated in particular for the seat bearing a passenger and subjected to accelerations that are normal or exceptional in use.

In one embodiment as illustrated in FIG. 2, the housing receptacle 160 is reinforced by one or more gusset plates 161 in a longitudinal direction at the top sole 143 in order to ensure safe transmission of load. An equivalent result can also be obtained using added structural load-transmitting connecting rods 161a.

As also visible in FIG. 2, a main axis 162 of the structural box section receptacle 160 is oriented with a desired inclination for the beam of the seat so that the inclination of the beam is obtained with a straight beam which is simpler and lighter in weight than a beam which, in another embodiment not illustrated, may be angled.

Fixing means, not depicted, fix the beam 122 into the housing receptacle 160 so that the said beam is immobilized and cannot become detached from the floor when the seat-floor assembly is subjected to accelerations in operation.

In the case of the embodiment considered, such fixing means may for example consist of bolts or of quick fit pins or locking devices.

Means of electrical connection, pneumatic connection and/or hydraulic connection, which have not been depicted, are where appropriate arranged in the housing receptacle or on an exterior face of the said housing receptacle to connect seat auxiliaries, for example electrical outlets, pneumatic connectors or hydraulic connectors if the seat is provided with devices employing one or more of these forms of energy.

In one embodiment, the housing receptacle 160 is fixed in such a way that a maintenance operative can easily fit or remove it from the floor element 140. Thus, when a cabin layout does not require any seat at a location determined by a housing receptacle, the said receptacle can be removed in order to avoid having to carry unnecessary weight, the gap left in the floor of the location of the removed housing receptacle then advantageously being closed off by a simple blanking plate of suitable dimensions.

Where appropriate, if it is not desirable to remove the housing receptacle 160 when it is not supporting a seat, a blanking plate is simply fixed over the said receptacle in order to close off the top opening of the said housing receptacle that is left open in the absence of any beam placed in the said housing receptacle.

It must be noted that the housing receptacle 160 does not necessarily have a closed end at its bottom, it therefore being possible for the beam to protrude underneath the receptacle. However, a structural closed end improves the rigidity of the housing receptacle if necessary and a structural or non-structural closed end provides containment for any object that might drop into the receptacle and which might otherwise become lodged at points to which access for extracting them is difficult. Advantageously, one or more drainage holes are made in a closed end of the housing receptacle at a low point in order to prevent any buildup of accidentally spilt liquid or condensate.

It will be appreciated from the description of the first embodiment of the invention which has just been given that a seat 120 becomes particularly simple for an operator to fit and remove by housing the base 123 of the beam in the housing receptacle fixed to the floor element 140 of a cabin.

Figure 1:
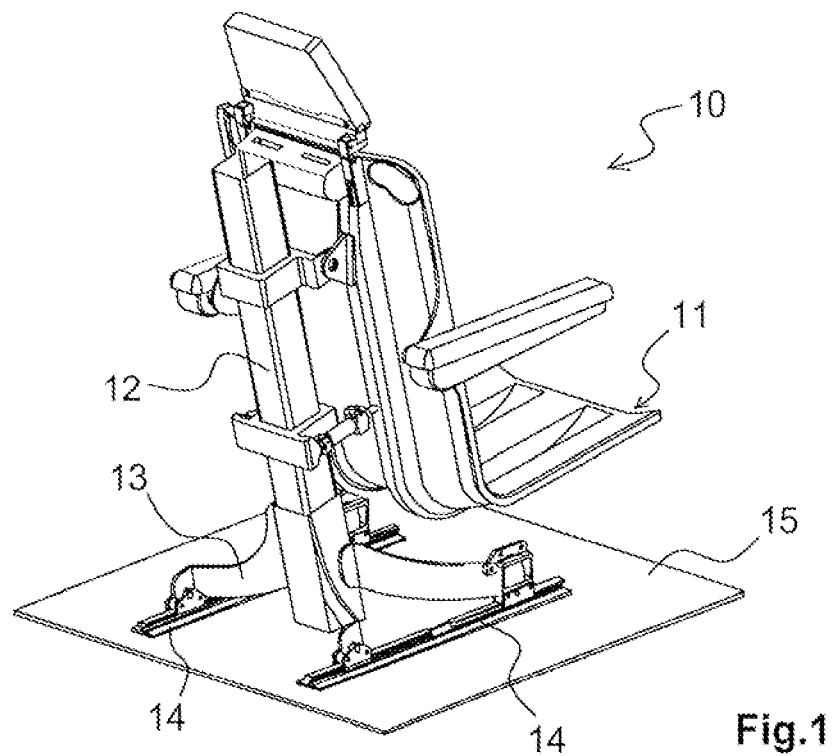
FIG. 1: an example from the prior art of a seat fixed to floor rails, applied to a monobeam seat.

Such an act of housing avoids the use of floor rails and avoids the base of the seat having to be widened by a structure for attaching to the floor rails, as it was in the example illustrated in FIG. 1, while at the same time ensuring that the fixing loads for holding the seat in position under all loading scenarios are reacted.

The result of this is that the footprint of a seat at floor level is particularly small, substantially the cross section of the beam, and that the clear space obtained can be put to good use to give a passenger seated behind the seat in question the possibility of placing his feet one on each side of the beam completely unhindered.

The absence of structures between the seat cushion and the housing receptacle also means that the vertical travel of the cushion is increased over conventional solutions, making it possible to reduce the vertical loading experienced by an occupant of the seat in the event of a crash involving high vertical accelerations.

Furthermore, in the embodiment described and unlike in the known solutions, the floor element is incorporated into the floor structure engineered for transmitting load and is advantageously incorporated into the structure of the vehicle, for example an aeroplane or a helicopter, to optimize the transmission of load through the various parts of the structure of the said vehicle.

For example, the stiffened panel 141 which is engineered from a structural standpoint in terms of the load to be reacted upon the housing of the beam, and more generally of all of the seats of the floor element, particularly in the case of accelerations generated by an aircraft crash, is able to transmit general fuselage structure loading and thus reduce the stress and therefore the mass in parts of the fuselage other than the floor.

The first embodiment illustrated in FIG. 2 that has just been described, and in which the beam is fixed to the structure of the vehicle, floor element or other element, by the housing receptacle only in a single position can be varied and improved on in ways which afford additional advantages.

While in the first embodiment described the position of the seat is fixed, modifications to the position or inclination of the beam are however possible using another version of housing receptacle or, in order to alter the position of the seat, by fixing the housing receptacle at another location in the structure if this option has been planned for.

Figure 3:
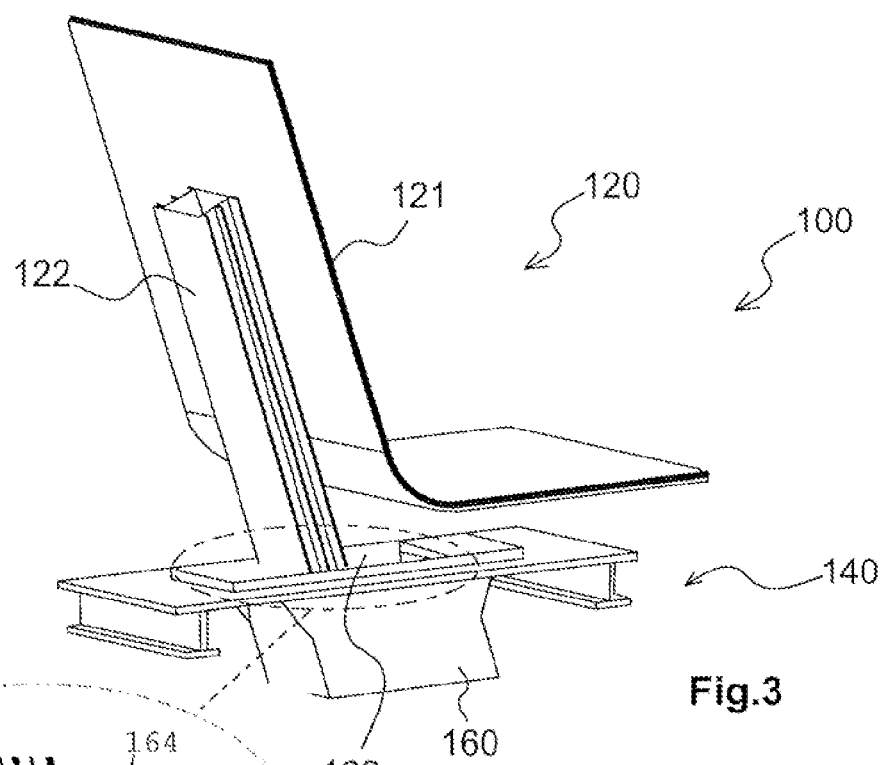
FIG. 3: a second embodiment of a seat-floor assembly according to the invention in which the beam can adopt several longitudinal positions in the housing receptacle in a longitudinal direction.

FIG. 3 shows a second embodiment of the seat-floor assembly 100 in which the housing receptacle 160 is elongate in the longitudinal direction of the seat and comprises a top opening cross section 163 that is likewise elongate in the same proportions in the longitudinal direction.

In this embodiment, the beam 122 can be fixed in the housing receptacle 160 at different longitudinal positions.

In this case, the seat 120 can be fixed at different positions which are more or less far forward when it is being installed, making it possible to achieve different cabin configurations or take into consideration particular constraints on the configurations.

Figure 4:
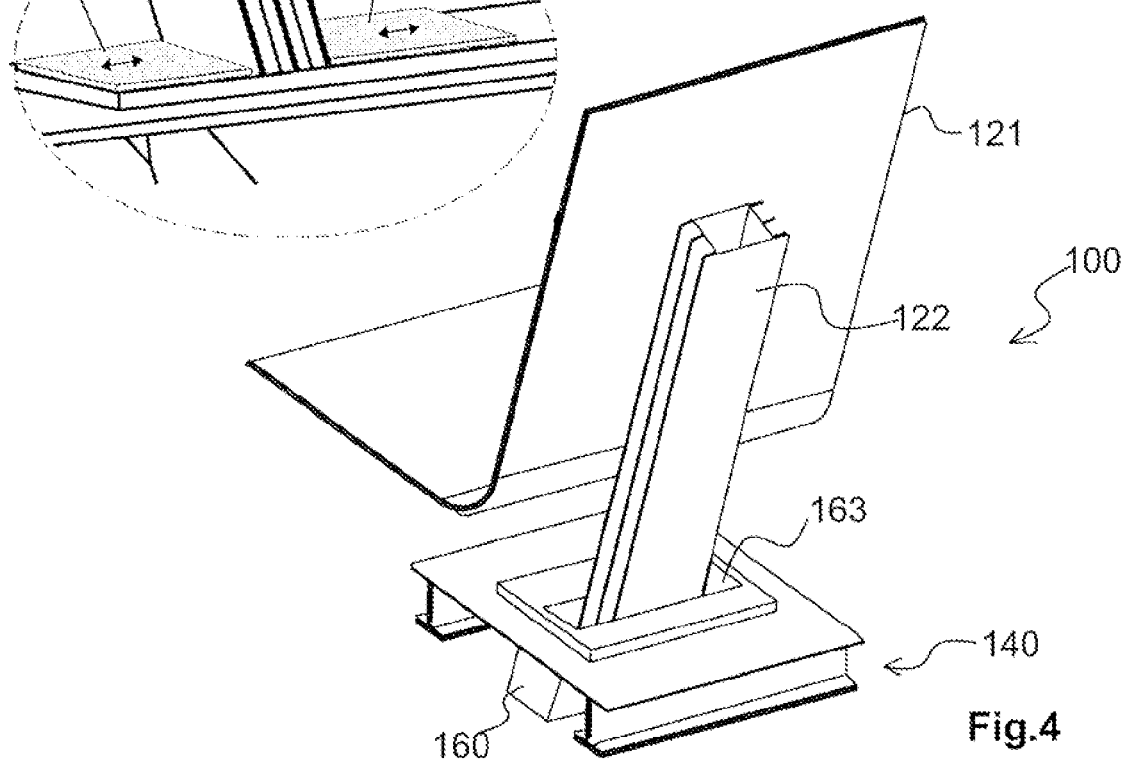
FIG. 4: a third embodiment of a seat-floor assembly according to the invention in which the beam can adopt several lateral positions in the housing receptacle in a transverse direction.

FIG. 4 shows a third embodiment of the seat-floor assembly 100 in which the housing receptacle 160 is elongate in a transverse direction of the seat and has a top opening cross section 163 which is elongate in the same proportion in the transverse direction.

In this embodiment, the beam 122 can be fixed into the housing receptacle 160 at different transverse positions.

In this case, the seat 120 can be fixed at different positions which are more or less offset laterally when it is being installed, making it possible to achieve different cabin configurations or to take into consideration special constraints in the layout such as the proximity of a side wall.

Through a suitable choice of the lateral extension of the housing receptacle and by a suitable positioning of various housing receptacles on a structure, for example a cabin floor, it is possible to convert a cabin between various comfort standards by changing the number of seats abreast across a width of cabin by altering a separation between adjacent seats.

Figure 5:
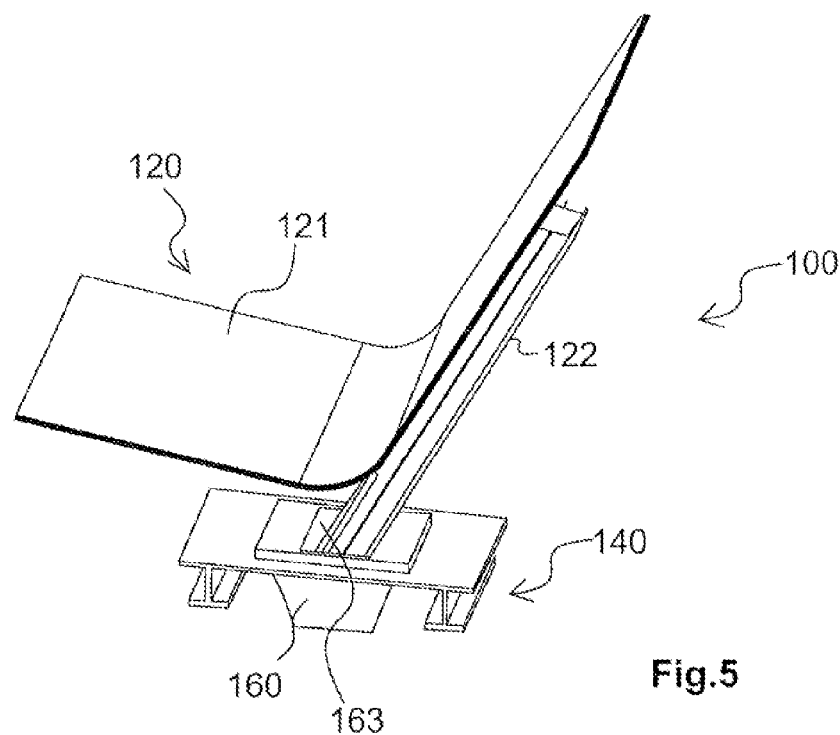
FIG. 5: a fourth embodiment of a seat-floor assembly according to the invention in which the beam can adopt several positions of inclination with respect to the vertical in the housing receptacle in a longitudinal direction.

FIG. 5 shows a fourth embodiment of the seat-floor assembly in which the housing receptacle 160 comprises a top opening cross section 163 in the longitudinal direction of the seat that is the cross section of the beam 122.

In this embodiment, the housing receptacle 160 comprises means of adjusting the inclination of the beam 122 which can therefore be inclined more or less backwards or forwards in a vertical plane.

The inclination may be simply adjustable, namely when the seat is fitted the beam 122 is mounted and fixed in the housing receptacle 160 with an inclination that is set by a fitter installing the seat.

The inclination can also be adjustable by a user of the seat. In such a case, the beam 122 is articulated in the housing receptacle 160 about a horizontal transverse axis of rotation and locking means, controlled by the user of the seat, immobilize the said beam in terms of rotation about the said axis.

In the example illustrated, as is evident from the shape of the receptacle which flares out towards the top, the axis of rotation is situated in a lower part of the housing receptacle 160 and the top opening 163 is elongate in the longitudinal direction.

In an alternative form that has not been illustrated, the axis of rotation is situated in an upper part of the housing receptacle so that the top opening is limited in elongation in the longitudinal direction and the receptacle is enlarged in its bottom part to allow the longitudinal movements of the bottom end of the beam.

In the various embodiments that have just been described, it must be pointed out that it is possible to fix a seat 120 facing towards the front of the vehicle or facing with its back to the front, without modifying the seat-floor assembly 100 or the structure.

In order to perform such a conversion all that is required is for the housing receptacle 160 to be mounted the other way around, the precaution having been taken, during the stage of designing the housing receptacle, to design it so that it can be mounted reversibly on the fixings on the top sole.

Provision may also be made for the housing receptacle 160 to be capable, without being turned round, of holding the beam with the seat oriented to face the front or oriented to face the rear of the vehicle. In this case, the housing receptacle 160 has a substantially symmetric profile and comprises means of fixing the beam 122 in each of the symmetric positions thereof.

Figure 6:
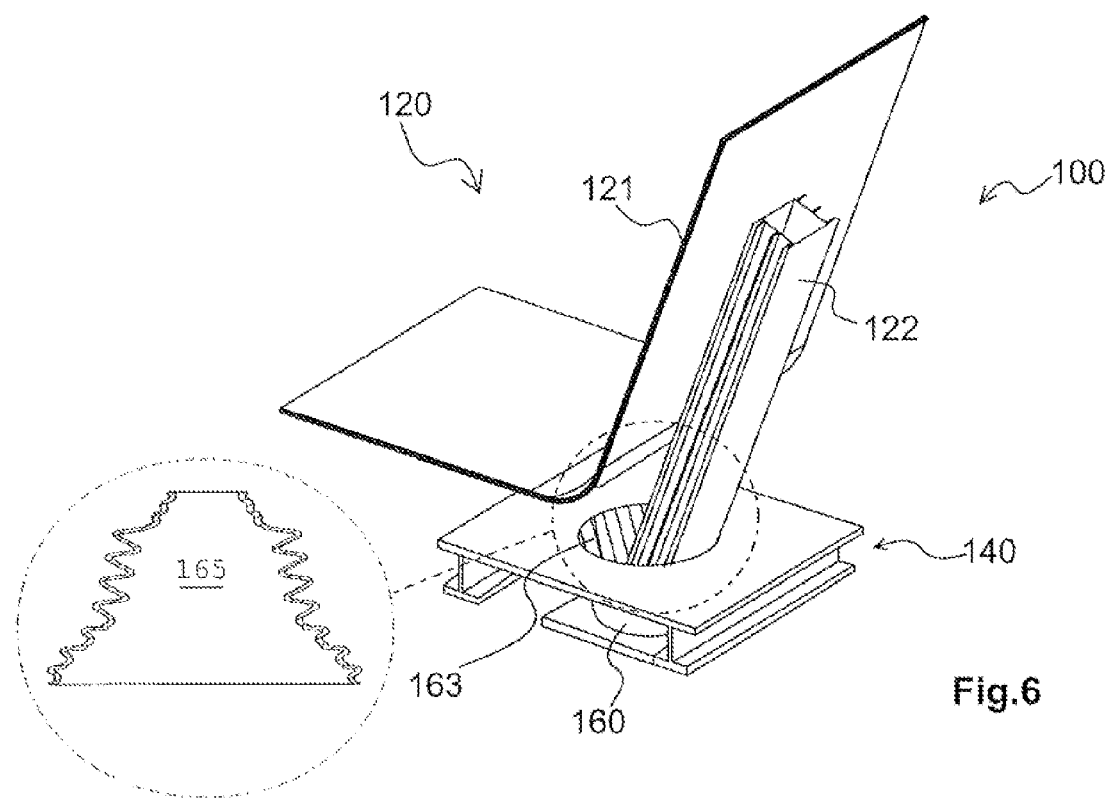
FIG. 6: a fifth embodiment of a seat-floor assembly according to the invention in which the beam can adopt several positions in a direction in a horizontal plane in the housing receptacle.

FIG. 6 depicts a fifth embodiment of a seat-floor assembly 100 according to the invention.

In this embodiment, the position of the seat, facing the front of the vehicle or with its back facing the front of the vehicle, or even oriented in some arbitrary direction with respect to the front of the vehicle, is obtained by rotating the beam 122 in the housing receptacle 160.

In the example illustrated in FIG. 6, rotation performed about a vertical axis of the beam 122, the said beam having a constant inclination towards the rear of the seat, leads to a housing receptacle 160 that is substantially axisymmetric and in the shape of a cone frustum.

However, this shape is just one particular case. On the one hand, other shapes of housing receptacle will allow the beam to be rotated and, on the other hand, the axial symmetry may be only partial particularly if the seat is designed to be turned only through part of a revolution and/or if the inclination of the beam towards the rear of the seat is not constant but changes according to the rotational position of the seat.

Means for locking and unlocking the rotation about the vertical axis of the beam 122 of the housing receptacle 160 when these are accessible to the user of the seat allow this user to alter the orientation of his or her seat.

Such an option allows modifications to be made to the relative layout of the seats in a cabin during use according to the needs of the users and the regulatory requirements such as, for example, during the takeoff and landing phases of an aircraft.

In each of the embodiments described in which the position or inclination of the seat 120 can be modified with respect to a reference system of the vehicle, the beam 122 can be fixed directly in the housing receptacle 160 or alternatively may be fixed in a sleeve, not depicted, providing an interface between the said beam and the said housing receptacle and advantageously grouping together all or some of the means employed for adjusting position or inclination.

Thus a seat may be produced that has a fixing interface at the base 123 of the beam 122 that is independent of the type of housing receptacle 160 which may for one and the same seat correspond to various embodiments as described.

It must be noted that the various embodiments are described such that each offers one capability to adjust a position or adjust a seat, but that various embodiments can be combined in order to increase the capability of adjustment or for adjusting a seat.

In general, in the embodiments which offer the option of fixing the beam to the housing receptacle in various positions, the conversion from one position to another possible position can be performed either as part of a change in configuration carried out by a maintenance operative or by an occupant of the seat wishing to alter a comfort position thereof.

In the latter instance, controls are made available to the user of the seat that allows him to unlock the movements, which are left modifiable by the occupant of the seat, in the sense of making the desired modification and then locking the seat again when the desired position has been reached.

Wherever necessary, blanking plates, preferably close off the part of the top opening 163 on the sides of the beam 122.

As shown in FIGS. 3 and 6, these blanking plates if necessary take the form of sliding flaps 164 or other means, for example a gaiter 165, and constantly close off the top opening 163 of the receptacle to prevent objects from falling into the receptacle.

The invention therefore makes it possible to create seats of a particularly simple design or at least seats of which most of the cushion and backrest elements are independent of the way in which the seat is fixed to the structure or to the floor without the requirement of mounting clearances, or at least with clearances that are smaller by comparison with the conventional solutions, but without thereby losing the possibilities of adjusting and setting the positions of the seat.

The invention also allows the design of the seat and of the floor to be integrated with one another, thus allowing the structure of the floor and of the vehicle to benefit from the reinforcements that the seat needs.

Thus, the fuselage of an aircraft, such as an aeroplane or helicopter, comprising such a seat-floor assembly finds itself reinforced by the floor elements on which the seats are fixed.

The invention claimed is:

1. A seat assembly comprising a mono-beam seat and a housing receptacle to fix a beam of the mono-beam seat to a structure of a vehicle;
    the housing receptacle, to be fixed under a floor of the vehicle on which the mono-beam seat is arranged, comprises an open on its top face so that inside of the housing receptacle is accessible from a top of the floor;
    the mono-beam seat is fixed by a base of the beam entering the housing receptacle via the open top face so that a substantial proportion of structural stress generated by the mono-beam seat in use is transmitted to the housing receptacle; and
    the housing receptacle comprises an immobilizing device at the base of the beam configured to fix a position of the beam in at least two different positions inside the housing receptacle at a constant depth.

2. The seat assembly according to claim 1, wherein the mono-beam seat is fixed only by the beam entering the housing receptacle so that the structural stress generated by the mono-beam seat is transmitted to the housing receptacle.

3. The seat assembly according to claim 1, wherein the housing receptacle comprises fixing points for fixing the housing receptacle to the structure of the vehicle, the fixing points are arranged such that the housing receptacle is removable and reversible in a longitudinal orientation.

4. The seat assembly according to claim 1, wherein the housing receptacle is elongate in a longitudinal direction; and wherein the immobilizing device is configured to fix base of the beam in the housing receptacle in said at least two different positions in a longitudinal direction of the mono-beam seat corresponding to a rear-aft direction for an occupant of the mono-beam seat.

5. The seat assembly according to claim 1, wherein the housing receptacle is elongate in a transverse direction; and wherein the immobilizing device is configured to fix the base of the beam in the housing receptacle in said at least two different positions in a transverse direction of the mono-beam seat corresponding to a left-right direction for an occupant of the mono-beam seat.

6. The seat assembly according to claim 1, wherein the immobilizing device is configured to fix the base of the beam in the housing receptacle to have at least two different angular positions in terms of an inclination of the beam relative to a vertical direction in a longitudinal vertical plane.

7. The seat assembly according to claim 1, wherein the immobilizing device is configured to fix the base of the beam in the housing receptacle to have at least two different directions in a vertical plane of symmetry of the mono-beam seat.

8. The seat assembly according to claim 1, wherein the housing receptacle comprises a sliding or pivoting sleeve in which the beam is fixed, and a locking device to immobilize a position of the slid or pivoted sleeve relative to the housing receptacle.

9. The seat assembly according to claim 8, further comprising controls, accessible to a user of the moonbeam seat, configured to unlock and lock the immobilizing device.

10. The seat assembly according to claim 8, further comprising controls, accessible to a user of the moon-beam seat, configured to actuate the locking device to immobilize the beam in different positions.

11. The seat assembly according to claim 1, further comprising one or more flaps to close off a space between the beam and a top opening of the housing receptacle.

12. The seat assembly according to claim 1, further comprising a gaiter to close off a space between the beam and a top opening of the housing receptacle.

13. A seat-floor assembly for a vehicle comprising a floor element and incorporating at least one assembly according claim 1, wherein the floor element comprises a stiffened panel structure having one face forming a top sole of at least one floor cross member; and wherein the housing receptacle is open on the top sole and fixed to at least to one of the top sole and said at least one floor cross member.

14. The seat-floor assembly according to claim 13, further comprising gusset plates for reinforcing a structural connection between the housing receptacle and at least one of the top sole and said at least one floor cross member.

15. The seat-floor assembly according to claim 13, further comprising structural connecting rods for reinforcing a structural connection between the housing receptacle and at least one of the top sole and said at least one floor cross member.

16. An aircraft fuselage comprising a floor incorporating one or more seat-floor assemblies according to claim 13.

* * * * *